United States Patent [19]

Yamada et al.

[11] Patent Number: 5,631,985
[45] Date of Patent: May 20, 1997

[54] OPTICAL CONNECTOR WHEREIN AN ARRANGEMENT PLANE OF POSITIONING PIN HOLES AND OPTICAL FIBERS IS INCLINED WITH RESPECT TO AN ABUTTING DIRECTION

[75] Inventors: Hiroyuki Yamada; Kenji Suzuki; Koichi Takagi; Takashi Shigematsu; Mikio Ishihara; Jun Yamakawa, all of Tokyo; Shinji Nagasawa, Mito, all of Japan

[73] Assignees: The Furukawa Electric Co., Ltd.; Nippon Telegraph and Telephone Corporation, both of Tokyo, Japan

[21] Appl. No.: 536,696

[22] Filed: Sep. 29, 1995

[30] Foreign Application Priority Data

Oct. 13, 1994 [JP] Japan .................................. 6-247903

[51] Int. Cl.⁶ .......................................................... G02B 6/38
[52] U.S. Cl. ........................... 385/59; 385/60; 385/76
[58] Field of Search ........................... 385/54, 59, 60, 385/76, 77, 78, 83

[56] References Cited

U.S. PATENT DOCUMENTS

| | | | |
|---|---|---|---|
| 4,615,581 | 10/1986 | Morimoto | 385/59 |
| 5,214,730 | 5/1993 | Nagasawa et al. | 385/59 |
| 5,339,377 | 8/1994 | Takahashi | 385/59 |

FOREIGN PATENT DOCUMENTS

| | | | |
|---|---|---|---|
| 4338605A1 | 5/1994 | Germany | 385/59 |
| 58-152212 | 9/1993 | Japan | 385/59 |
| 6-47912 | 6/1994 | Japan | 385/59 |

Primary Examiner—Rodney B. Bovernick
Assistant Examiner—Ellen Eunjoo Kang
Attorney, Agent, or Firm—Frishauf, Holtz, Goodman, Langer & Chick

[57] ABSTRACT

An optical connector including a ferrule having a butt end face at a front portion thereof and positioning holes formed at opposite sides of the ferrule in a widthwise direction of the ferrule. A plurality of optical fibers are coupled to the ferrule, and the optical connector is adapted to be abutted against another optical connector in an abutting direction. The positioning pin holes and the plurality of optical fibers are arranged in parallel with each other at least in the vicinity of the butt end face of the ferrule so that an arrangement plane of the plurality of optical fibers and the positioning pin holes is inclined at an inclination angle of θ with respect to a plane of the abutting direction, and so that a line where the butt end face and the arrangement plane cross each other is orthogonal to each axis of the plurality of optical fibers. The ferrule further includes a rear end portion arranged so that a pressing force is applied in a substantially vertical direction with respect to the butt end face when the optical connector is abutted against another optical connector and pressed in the abutting direction.

4 Claims, 8 Drawing Sheets

OPTICAL CONNECTOR WHEREIN AN ARRANGEMENT PLANE OF POSITIONING PIN HOLES AND OPTICAL FIBERS IS INCLINED WITH RESPECT TO AN ABUTTING DIRECTION

BACKGROUND OF THE INVENTION

1. Field of the Invention

The present invention relates to an optical connector.

2. Description of the Prior Art

Various optical connectors have been used for connection or changeover of optical fibers.

For instance, in FIG. 13, there is shown a first optical connector 1 which comprises a rectangular-parallelpiped ferrule 2 having a butt end face 2a at the front portion of the ferrule 2 and positioning pin holes 2b, 2b formed at the opposite sides in a widthwise direction of the ferrule 2, and a fiber ribbon 3 having a plurality of optical fibers 3a, mounted to an rear portion of the ferrule 2. These pin poles 2b and respective optical fibers 3a are arranged in parallel with each other so that they are perpendicular to the butt end face 2a.

In the case where the optical connector 1 is abutted against an another optical connector 1 so as to make an optical communication line connection, a refractive index matching agent is applied on the butt end face 2a so as to prevent a light from being reflected backward, and these optical connectors 1 are abutted against each other by interposing positioning guide pins between pin holes 2b, 2b of the connectors opposed to each other.

Moreover, in order to prevent the foregoing reflection of light from occurring in the butt end face without using the refractive index matching agent, a second optical connector has been used. To give an example of the second optical connector, in FIG. 14, there is shown an optical connector 4 having a butt end face which is inclined with respect to an optical axis of an optical fiber. In an optical connector 4 shown in FIG. 14A, a butt end face 5a at the front portion of a ferrule 5 is formed so that the lower portion of the butt end face 5a is inclined backward by an angle of $\theta_1$ with respect to a vertical direction. On the other hand, in an optical connector 4 shown in FIG. 14B, the butt end face 5a at the front portion of the ferrule 5 is formed so that a left-hand side of the butt end face 5a is inclined backward by an angle of $\theta_2$. As described above, the respective butt end faces 5a are inclined with respect to the optical axis of each optical fiber 6a to prevent an end reflection from occurring in the butt end face. In both optical connectors 4, pin holes 5b and respective optical fibers 6a of a ribbon fiber 6 are arranged in parallel with each other, like the optical connector 1.

Also, Unexamined Japanese Patent Publication (KOKAI) No. 58-152212 discloses a third optical connector which can prevent a reflection of light from occurring in an butt end face without using a refractive index matching agent. In that optical connector, an end reflection is prevented from occurring by inclining optical fibers in only the vicinity of the butt end face.

However, the foregoing first optical connector requires wiping off or applying the refractive index matching agent on the butt end face every time that the first optical connector is abutted against an another optical connector. For this reason, there has arisen a problem in that not only an abutting work is troublesome, but also the working place becomes dirty due to the refractive index matching agent.

Further, the foregoing second optical connector has a butt end face which is formed with an inclined plane; therefore, the butt end face is not parallel with a back end of the ferrule. For this reason, in the case where the second optical connector is abutted against an another connector, if a pressing force is applied to the abutting direction, a difference occurs in alignment between butt end faces of these optical connectors abutted against each other. As a consequence, great optical connection loss is caused.

Furthermore, the foregoing third optical connector is constituted so that optical fibers are inclined in only the vicinity of the butt end face. For this reason, there has arisen a problem in that the structure of this connector is complicated; therefore, it takes much time to manufacture such a connector, and such connector is expensive to manufacture.

SUMMARY OF THE INVENTION

The object of the present invention is to provide an optical connector which has no need for a refractive index matching agent, which does not cause a great connection loss when the optical connector is abutted against an another optical connector, and which is simple in structure and inexpensive to manufacture.

To achieve the above object, according to the present invention, in an optical connector which comprises a ferrule having a butt end face at the front portion of the ferrule and positioning pin holes formed on the opposite sides in the widthwise direction and a plurality of optical fibers mounted to a rear end portion of the ferrule, and which is abutted against an another optical connector, the ferrule has a constitution in which the positioning pin holes and the plurality of optical fibers are arranged in parallel with each other at least in the vicinity of the butt end face so that an arrangement plane of the plurality of optical fibers and positioning pin holes is inclined at an angle of $\theta$ with respect to a plane of the abutting direction, and so that a line, in which the butt end face and the arrangement plane cross each other, is orthogonal to each axis of optical fibers. Further, the ferrule has a rear end portion which is constituted so that a pressing force is applied in a substantially vertical direction with respect to the butt end face when the optical connector is abutted against an another connector having a like shape and is pressed against the abutting direction.

Preferably, the inclination angle $\theta$ is set to a range of $(90-\theta_{c1})/2 < \theta < \theta_{c0}$ when a critical angle of light emitted from a core of the optical fiber to an air is set to $\theta_{c0}$ and a critical angle of light emitted from the core to a clad of optical fiber is set to $\theta_{c1}$.

More preferably, the inclination angle $\theta$ ranges from 6° to 10°.

According to the present invention having a constitution described above, a reflected light is not returned from a fiber end face; therefore, the present invention can prevent the reflected light from being returned backward. Moreover, the pressing force in the abutting direction is applied so as to be an approximately straight line; therefore, when the optical connector is abutted against an another optical connector, a state of being abutted can be readily kept without causing a difference in alignment between butt end faces of these connectors.

As described above, if the inclination angle $\theta$ of the arrangement plane of the plurality of optical fibers and positioning pin holes is set to a range of $(90-\theta_{c1})/2 < \theta < \theta_{c0}$, more preferably, to a range of 6° to 10°, a light transmitted through an optical fiber is emitted from a core without causing a total reflection on the end face of the optical fiber; therefore, connection loss is prevented from increasing. This is based on the reason described below.

FIG. 15 is a sectional view of a typical optical fiber 8 having an inclined butt end face (an inclination angle θ=θin), explaining the foregoing reason why the total reflection is prevented from occurring in the end face.

The optical fiber 8 comprises a core 8a and clad 8b, and is formed with an inclined end face 8c. In the optical fiber 8, the end face 8c is exposed to an air, and assuming that each refractive index of the core 8a, the clad 8b and the air is set to n1, n2 and n0.

In general, in the case where the end face 8c of the optical fiber 8 is perpendicular to the optical axis AL, 3 to 4 percentages of light transmitted through the core 8a is reflected due to a difference in the refractive index between the core 8a and air because the end face 8c is exposed to the air. Then, the reflected light is returned backward by the total reflection if an incident angle of light from the core 8a to the clad 8b exceeds the critical angle $\theta_{c1}$.

On the contrary, as shown in FIG. 15, if the optical fiber 8 has an inclined end face 8c (an inclination angle θ=θin), it is possible to make an incident angle from the core 8a to the clad 8b smaller than the critical angle $\theta_{c1}$. In this case, for example, if the refractive index n1 of the core 8a is set to 1.465 and the refractive index n2 of the clad 8b is set to 1.46, the critical angle $\theta_{c1}$ is obtained from the following equation.

$$\theta_{c1}=\sin^{-1}(n2/n1)=\sin^{-1}(1.46/1.465)=85°$$

Thus, the lower limit value of the inclination angle θ is obtained from FIG. 15 as below.

$$(90°-85°)/2=2.5°$$

Accordingly, if the inclination angle θ of the end face 8c is 2.5° or more, a light emitted from the core 8a of the optical fiber 8 is incident on an another optical fiber connected, so that a light transmission can be performed. Moreover, the optical fiber 8 has an inclined end face; for this reason reflected light is generated when a light is emitted from the core 8a. However, the reflected light is incident on the clad 8b from the core 8a, and attenuates gradually. Therefore, the reflected light is not returned backward.

On the other hand, the upper limit value of the inclination angle θ is the critical angle $\theta_{co}$ of the light emitted from the core 8a of the optical fiber 8 to the air. The critival angle $\theta_{co}$ can be obtained as follows when, for example, the refractive index of core n1=1.465 and the refractive index of air n0=1.

$$\theta_{co}=\sin^{-1}(n0/n1)=\sin^{-1}(1/1.465)=43°$$

Based on the above description, the inclination angle θ can be expressed by a general expression as shown below.

$$(90-\theta_{c1})/2<\theta<\theta_{co}$$

According to preferred embodiments of the present invention, there is provided an optical connector which has no need of a refractive index matching agent without causing a great connection loss when the optical connector is abutted against an another optical connector, and is inexpensive with a simple structure.

Moreover, a ferrule has a rear end portion which is constituted so that a pressing force by pressing means is applied on a butt end face of the ferrule in the approximately vertical direction; therefore, a state of being abutted against an another optical connector can be stably kept.

The above and other objects, features, and advantages of the present invention will become more fully understood from the following detailed description when taken in conjunction with the accompanying drawings which illustrate preferred embodiments of the present invention.

DETAILED DESCRIPTION OF THE PREFERRED EMBODIMENTS

One embodiment of the present invention will be described below in detail with reference to FIGS. 1 through FIG. 12E.

Figure 1:
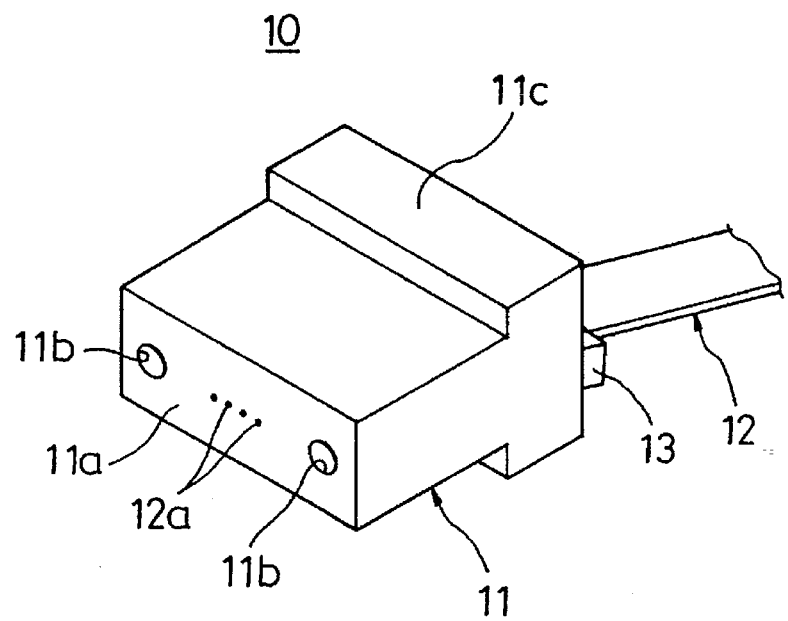
FIG. 1 is a perspective view of an optical connector according to the present invention.

In FIG. 1, an optical connector 10 comprises a ferrule 11 and a ribbon fiber 12.

The ferrule 11 has a butt end face 11a at its front portion, positioning pin holes 11b, 11b formed on the opposite sides in the widthwise direction of the ferrule 11, a flange portion 11c vertically projected from the body of ferrule 11, and a rear end portion 11d (shown in FIG. 2) which is parallel with the butt end face 11a. Also, the ferrule 11 is formed with a approximately flat and rectanglure parallelepiped made of a synthetic resin such as epoxy resin, for example.

The ribbon fiber 12 has a plurality of optical fibers 12a. A jacketed portion at the distal end of the plurality of optical fibers 12a is removed so that the optical fibers 12a are exposed, and the exposed optical fibers 12a are individually inserted and bonded into fiber holds (not shown) formed parallel at regular pitch in the ferrule 11, thus the ribbon fiber 12 being mounted to the ferrule 11. Moreover, the optical fibers extending from the rear end portion 11d of the ferrule 11 are protected by means of a rubber boot 13.

Figure 2:
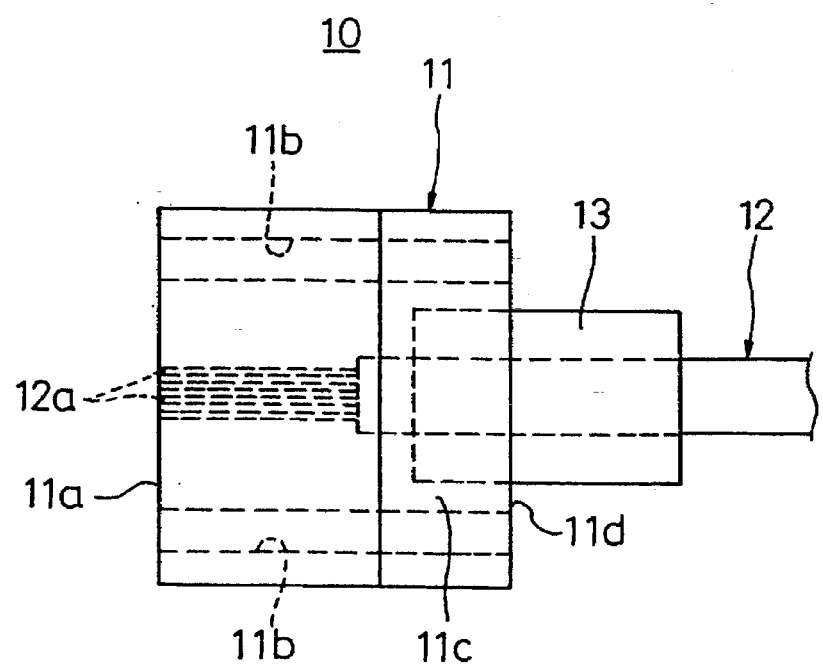
FIG. 2 is a plan view of the optical connector shown in FIG. 1.
Figure 3:
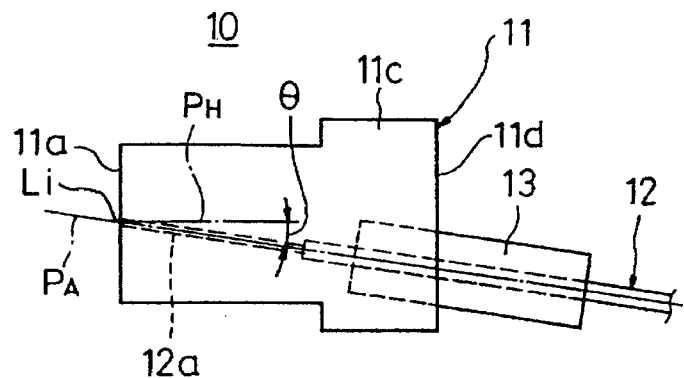
FIG. 3 is a left side view of the optical connector shown in FIG. 2.

In the optical connector 10 of the present invention, the ferrule 11 is constituted so that the pin holes 11b, 11b and the plurality of optical fibers 12a are arranged parallel with each other in the vicinity of the butt end face 11a of the ferrule 11, as shown in FIGS. 2 and 3. Moreover, the ferrule 11 is constituted so that an arrangement plane $P_A$ of the pin holes 11b, 11b and the plurality of optical fibers 12a is inclined at an angle of θ with respect to a horizontal plane $P_H$, as shown in FIG. 3, and so that a line $L_i$ where the butt end face 11a and the arrangement plane $P_A$ cross each other is vertical to each axis of the optical fibers 12a, and has a rear end portion 11d which is constituted so that a pressing force by pressing means is applied on the butt end face 11a in the approximately vertical direction.

In this case, if a critical angle of light emitted to the air from the core of the optical fiber 12a is set to $θ_{co}$ and a critical angle of light emitted to the clad from the core of the optical fiber 12a is set to $θ_{c1}$, the inclination angle θ is set to a range of $(90-θ_{c1})/2<θ<θ_{co}$, more preferably, to 6° to 10°. If the inclination angle θ is set to the range as described above, a light transmitted through an optical fiber is emitted from the core without causing a total reflection in an end face or an interface between core and clad of the optical fiber. Therefore, optical connection loss can be prevented from increasing. For instance, if the core of optical fiber made of glass having a refractive index of 1.465 and the refractive index of air is 1, the critical angle $θ_{co}$ is about 43°. In the ferrule of the present embodiment, the inclination angle θ is set to 8°.

The optical connector 10 is constituted so that the rear end portion 11d and the butt end face 11a of the ferrule 11 are parallel with each other. Thus, the optical connector 10 is manufactured in the manner that the respective optical fibers 12a are bonded and fixed to the corresponding fiber holes of the ferrule 11, and thereafter, the butt end face 11a is polished, like the conventional optical fiber.

In the polishing process, the butt end face 11a of the ferrule 11 is polished and reduced in a degree of 30 μm as compared with the initial butt end face. However, the pin holes 11b and optical fibers 12a are parallel with each other, so that there is no change in a positional relation between the pin holes 11b and the optical fibers 12a.

Figure 4:
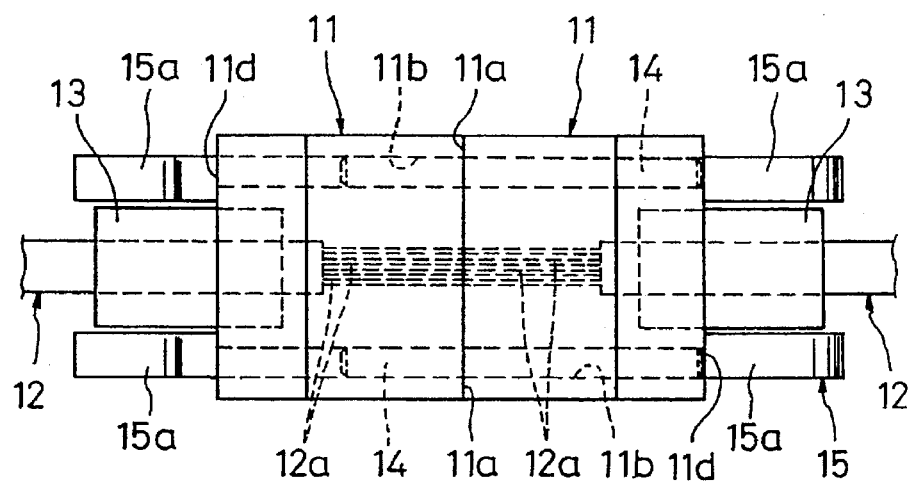
FIG. 4 is a plan view showing a state that optical connectors shown in FIG. 1 are abutted against each other.
Figure 5:
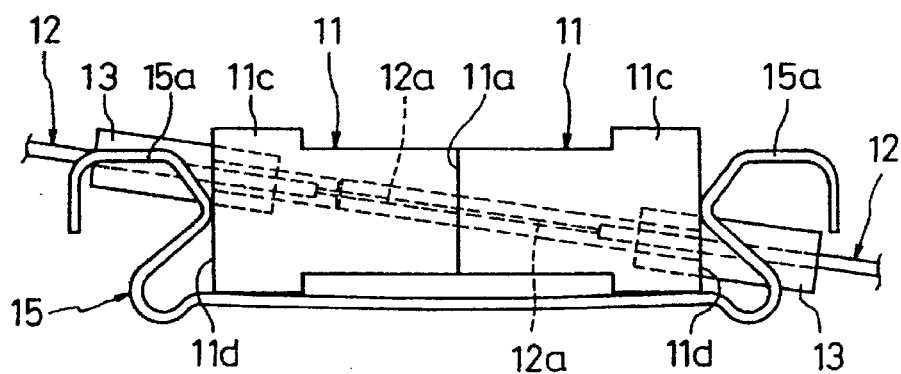
FIG. 5 is a left side view of optical connectors abutted against each other in FIG. 4.
Figure 6:
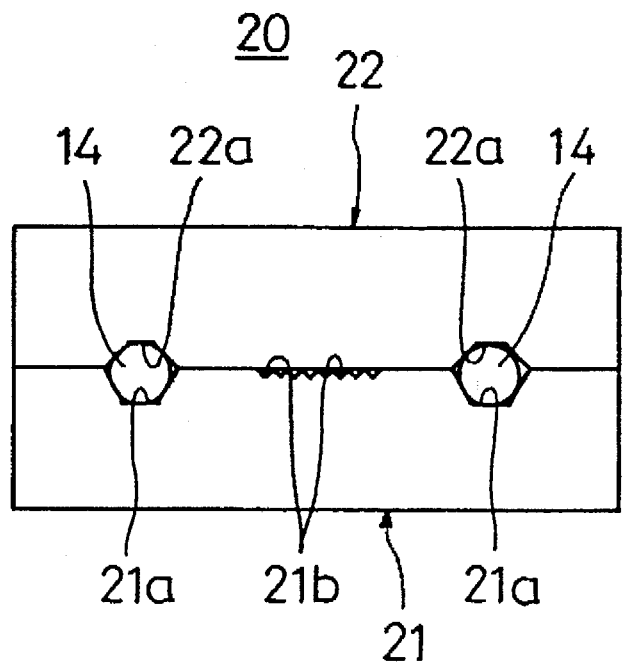
FIG. 6 is a front view showing a modified example of the optical connector according to the present invention.

In the case where the optical connector 10 constituted as above is abutted against an another optical connector 10 to perform an optical line connection, as shown in FIG. 4 and FIG. 5, butt end faces 11a, 11a of these connectors are arranged opposite to each other, and respective guide pins 14 are inserted in the pin holes 11b so as to be interposed between opposing pin holes 11b. Thereafter, a clip 15 is mounted to the abutted optical connectors 10.

The clip 15 has a plurality of elastic pieces 15a elastically fitted on the rear end portion 11d of the ferrule 11, and is used to keep a state that these optical connectors 10 and 10 are abutted against each other.

Thus, in the optical connector 10, the optical axis of respective optical fibers 12a is inclined in the vertical direction with respect to the butt end face 11a, so that a light on the fiber end face can be prevented from being returned backward. Moreover, there is no need of using a refractive index matching agent when the optical connector 10 is abutted against an another optical connector.

In addition, the optical connector 10 is constituted so that the rear end portion 11d and the butt end face 11a of the ferrule 11 are parallel with each other, and so that a pressing force in the abutting direction is applied in the substantially vertical direction with respect to the butt end face 11a so as to be a straight line. Therefore, no difference occurs in alignment between the butt end faces of optical connectors which are abutted against each other, and there is no occurrence of great optical connection loss in optical connectors abutting against each other. Moreover, the ferrule 11 has a simple structure, so that the optical connector 10 can be manufactured at a low cost.

The optical connector of the present invention is capable of using materials such as ceramic, metal and glass other than the foregoing synthetic resin. For instance, in an optical connector 20 shown in FIG. 6, a fiber baseplate 21 and a cover 22 may be made of the above materials.

The fiber baseplate 21 has trapezoidal-shaped grooves 21a and 21a for positioning guide pins 14. These grooves 21a are formed on the opposite sides of the upper face of baseplate 21. Further, the fiber baseplate 21 has a plurality of fiber grooves 21b for arranging optical fibers 12a of the ribbon fiber 12. These grooves 21b are formed in the center on the upper face. On the other hand, the cover 22 is formed with trapezoidal-shaped grooves 22a and 22a corresponding to the trapezoidal-shaped grooves 21a and 21a at its lower face.

The optical connector 20 is assembled as follows. The optical fiber 12a is arranged in the respective fiber grooves 21b, and then, a bonding agent is applied on the upper surface of the fiber baseplate 21, thus the cover 22 being mounted onto the fiber baseplate 21. At this moment, the guide pin 14 is held in a hexagonal-shaped hole defined by the trapezoidal-shaped groove 21a formed on the fiber baseplate 21 and the trapesoidal-shaped groove 22a formed on the cover 22.

Figure 7:
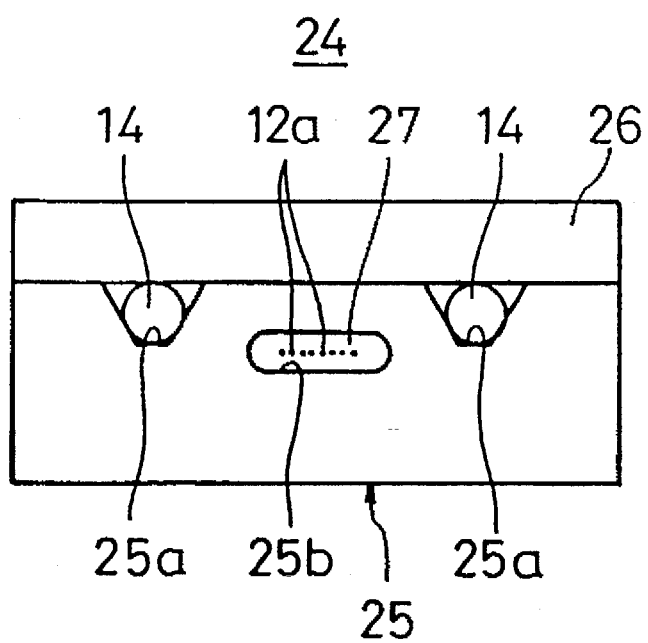
FIG. 7 is a front view showing an another modified example of the optical connector according to the present invention.

Also, as show in FIG. 7, an optical connector 24 may be composed of a fiber baseplate 25 and a cover 26 which are made of the above materials.

The fiber baseplate 25 is formed with a trapezoidal-shaped grooves 25a and 25a for positioning guide pins 14 at the opposite sides on the upper surface, and a fiber slot 25b for arranging a plurality of optical fibers 12a of the ribbon fiber 12 at the approximately center in the thickness direction. On the other hand, the cover 26 is a flat plate putted on the fiber baseplate 25, and guide pins 14 are held in holes defined by the cover 26 and the trapezoidal-shaped grooves 25a.

Then, the fiber ribbon 12 is inserted into the fiber slot 25b of the baseplate 25 in a state that the plurality of optical fibers 12a of the fiber ribbon 12 are exposed by removing the jacketed portions at the distal end thereof, and is fixed by means of a bonding agnet 27 such as epoxide. Thereafter, the guide pin 14 is arranged in the respective trapezoidal-shaped grooves 25a, and the cover 26 is bonded onto the upper surface of the baseplate 25 by means of the bonding agent. The optical connector 24 is manufactured in the manner described above. In this case, guide pins 14 are held in holes defined by the cover 26 and the trapezoidal-shaped grooves 25a, like the foregoing optical conector 20.

Figure 8:
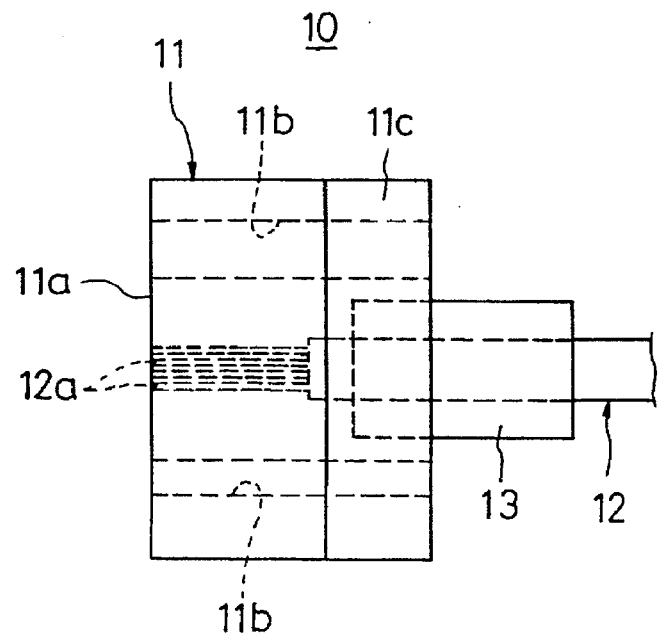
FIG. 8 is a plan view of the optical connector shown in FIG. 1, in which one of pin holes is formed as a slot extending in the widthwise direction so as to perform an optical line changeover.

In the case where the optical connector 10 is used for an optical line changeover, as shown in FIG. 8, one of pin holes 11b is formed so as to be a slot extending in the widthwise direction, and the optical connector 10 is abutted against another optical connector by means of guide pins 14 interposed between pin holes 11b opposing to each other.

In this case, one pin hole 11b formed as a slot has a length such that the guide pin 14 is capable of moving in the widthwise direction by an optical line changeover pitch when the side portion of one optical connector 10 is pressed.

Figure 9A:
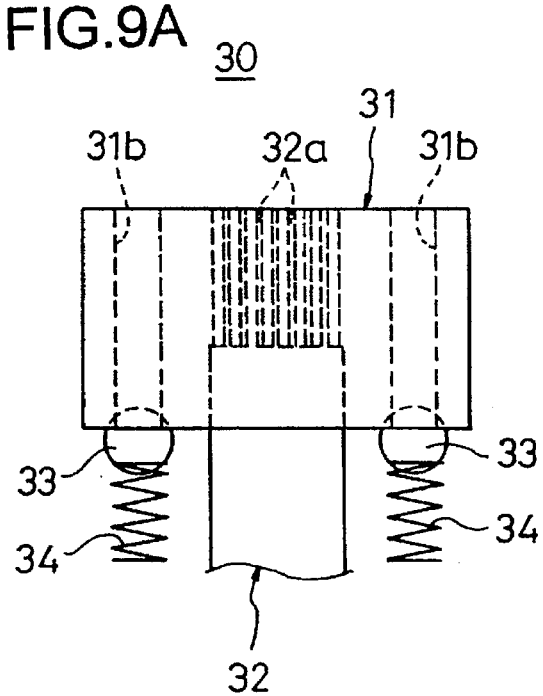
FIG. 9A and FIG. 9B are explanatory views showing a modified example of a shape of the rear end portion of the optical connector according to the present invention.
Figure 9B:
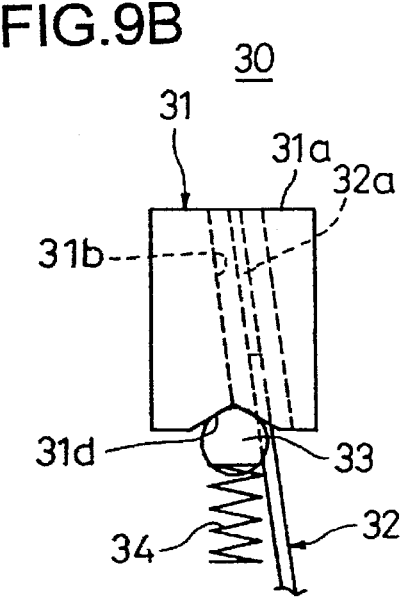

The above respective optical connectors thus described have a flat and rectangular parallelepiped shape constituted so that the butt end face and the rear end portion of the ferrule are parallel with each other. For instant, as shown in FIG. 9A and FIG. 9B, in an optical connector 30, a V-shaped groove 31d extending in the widthwise direction may be formed at a rear portion of a ferrule 31 in which a ribbon fiber 32 extends. FIG. 9A is a plan view of the optical connector 30; on the other hand, FIG. 9B is a right-hand side view of the optical connector 30.

Incidentally, in the following description, like reference numerals are used to designate like members of the optical connector 10 in order to omit the detailed explanation of like members.

In the optical connector 30, if the v-shaped groove 31d is formed at the rear portion of the ferrule 31, when the optical connector 30 is incorporated into a switching device in a state that the V-shaped groove 31d is pressed in the abutting direction by means of a spring 34 through a ball 33, as shown in FIG. 9, the V-shaped groove 31d and the ball 33 contact with each other at a point. This serves to reduce the frictional resistance caused by a pressing force when a stress in the changeover direction is applied.

Figure 10A:
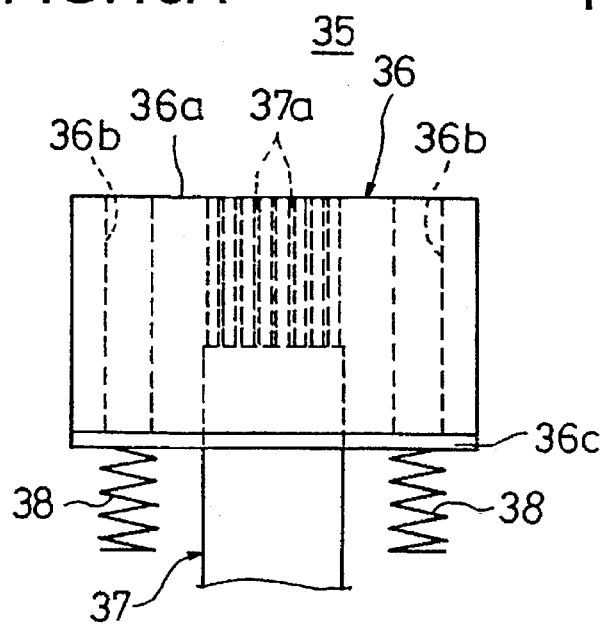
FIG. 10A and FIG. 10B are explanatory views showing an another modified example of a shape of the rear end portion of the optical connector according to the present invention.
Figure 10B:
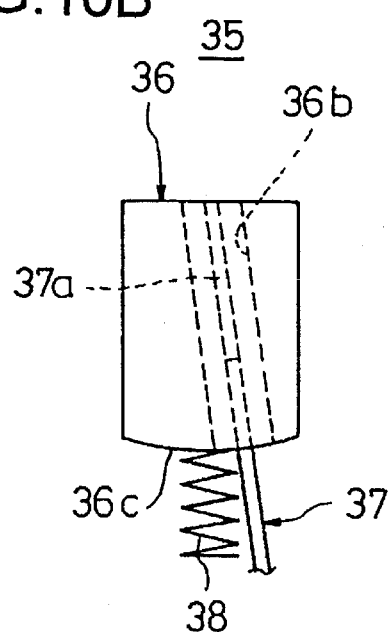

Also, as shown in FIG. 10A and FIG. 10B, in an optical connector 35, a rear portion 36c of a ferrule 36 in which a fiber ribbon 37 extends may be formed with a curved surface bulged backward. If the ferrule 36 so is formed, when the optical connector 35 is incorporated into a switching device through a spring 38 interposed between the rear end portion 36c, like the optical connector 30, a contacting area between the rear end portion 36c and the spring 38 becomes small. This serves to reduce the frictional resistance caused by a pressing force when a stress in the changeover direction is applied.

FIG. 10A is a plan view of the optical connector; on the other hand, FIG. 10B is a right-hand side view.

According to the present invention, as shown in FIG. 12A through FIG. 12E, an optical connector 40 is constituted so that a pressing force is applied in the approximately vertical direction with respect to a butt end face 41a of a ferrule 41 when a rear end portion 41c of the ferrule 41 in which a ribbon fiber 42 extends is pressed in the abutting direction by means of a spring 44 through the spring 44 or ball 43.

Figure 12A:
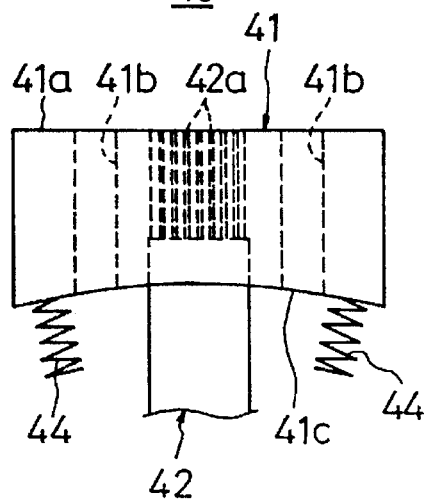
FIG. 12A through FIG. 12E are plan views showing still another modified examples of a shape of the rear end portion of the optical connector according to the present invention.
Figure 12B:
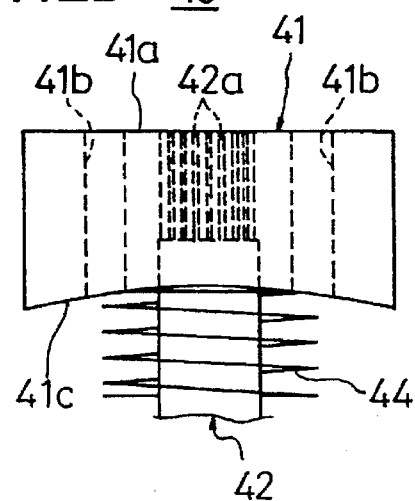
Figure 12C:
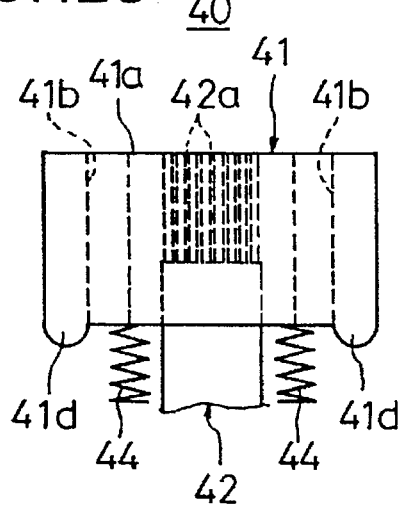
Figure 12D:
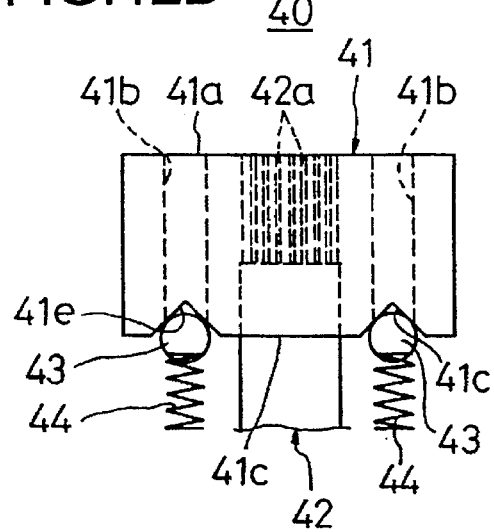
Figure 12E:
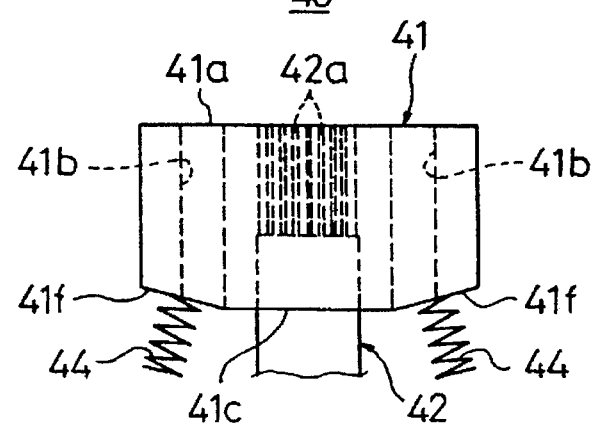
Figure 13:
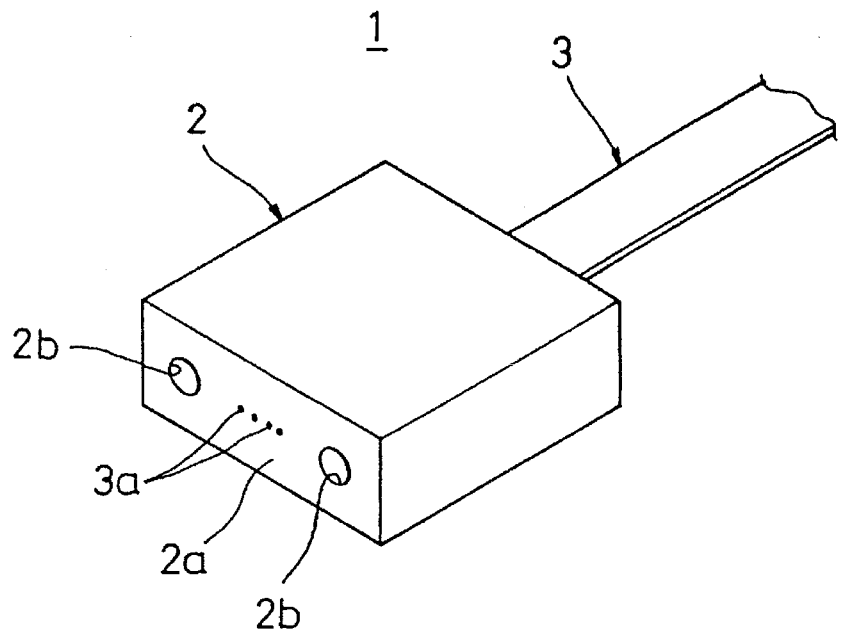
FIG. 13 is a perspective view of a conventional optical connector.

More specifically, as shown in FIG. 12A and FIG. 12B, the rear end portion 41c of the ferrule 41 is formed into a circular-arc shape, and is pressed by one or two springs 44. As shown in FIG. 12C, a portion between bulged portions 41d at the opposite sides of the ferrule 41 is formed into a flat surface, and the ferrule 41 is pressed by springs 44 located on the flat-surface portion. As shown in FIG. 12D, the optical connector 40 is constituted so that the rear end portion 41c of the ferrule 41 is formed with V-shaped grooves 41e and 41e, and the rear end portion 41c is pressed by means of a spring 44 through a ball 43 located in each of the V-shaped grooves 41e. As shown in FIG. 12E, the optical connector is so that the rear end portion 41c of the ferrule 41 is formed with inclined portions 41f at its opposite sides, and the inclined portions 41f are pressed by springs 44.

Figure 11:
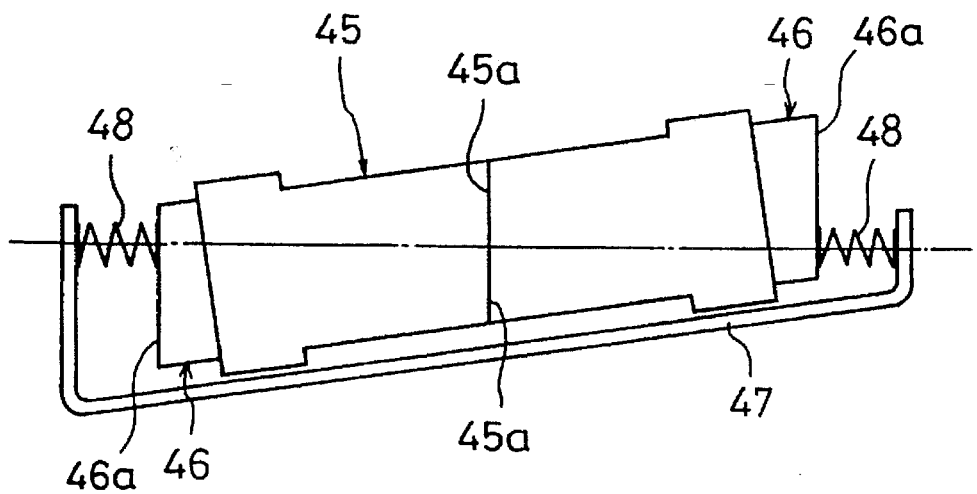
FIG. 11 is a side view showing an another modified example of the optical connector according to the present invention.
Figure 14A:
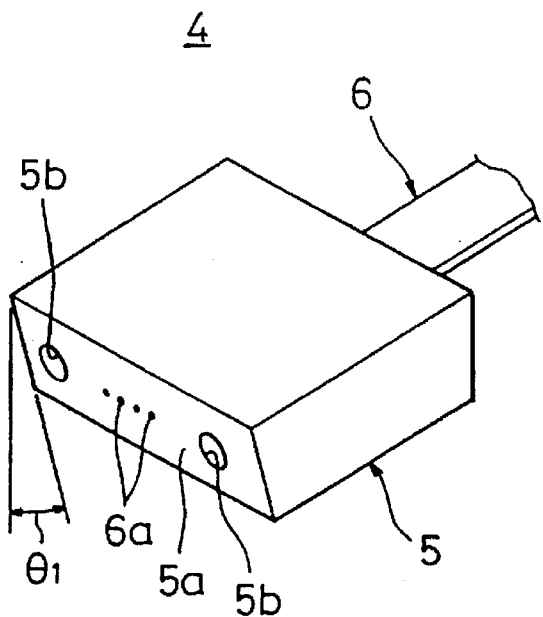
FIG. 14A and FIG. 14B are perspective views showing other conventional optical connectors.
Figure 14B:
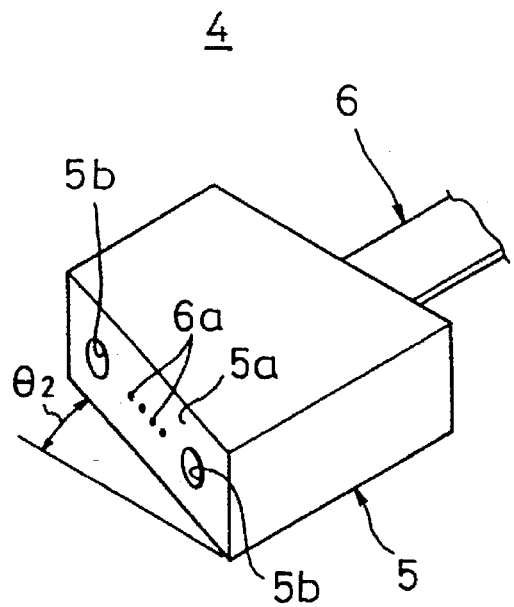
Figure 15:
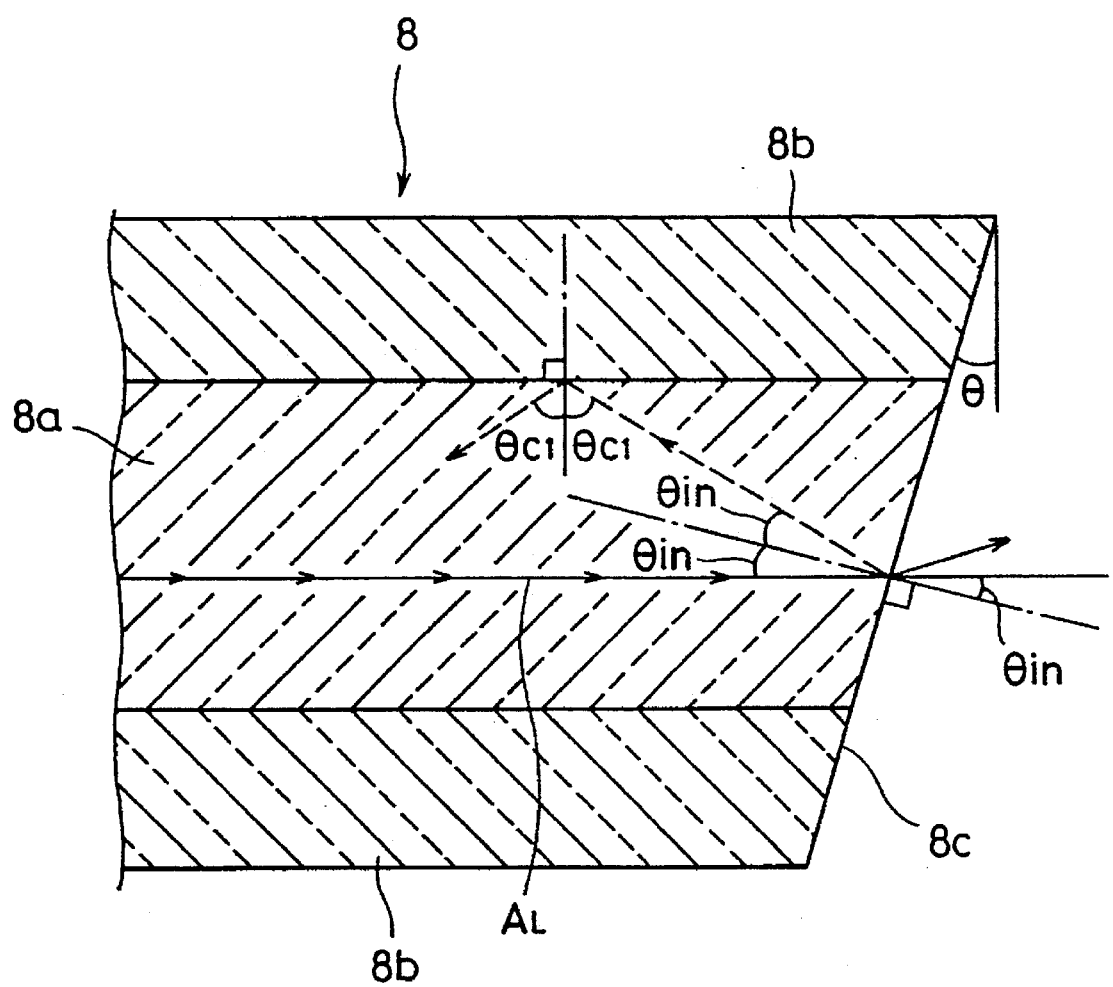
FIG. 15 is a sectional view for explaining a reason why a total reflection is prevented from occurring in a typical optical fiber having an end face which is formed with an inclined plane by setting an inclination angle to θ.

Moreover, according to the present invention, as shown in FIG. 11, an optical connector 45 may be constituted like the optical connector 4 shown in FIG. 14A already described in the prior art. More specifically, only butt end face 45a of the optical connector 45 is inclined in the vertical direction, and an intermediate member 46 is fixed to the rear end portion of the optical connector 45 by bonding so that a rear end face 46a of the intermediate member 46 is parallel with the butt end face 45a.

If constituted as described above, the optical connector 45 is abutted against another optical connector 45 by interposing guide pins between pin holes (not shown) opposing to each other. In this case, a pressing force in the abutting direction is applied on the approximately straight line as shown by a dotted chain line, by means of a spring 48 interposed between a holder 47 and the intermediate member 46.

What is claimed is:

1. An optical connector comprising:
a ferrule having a butt end face at a front portion thereof, and positioning pin holes formed at opposite sides of said ferrule in a widthwise direction of said ferrule; and
a plurality of optical fibers coupled to said ferrule; and
wherein said optical connector is adapted to be abutted against another optical connector in an abutting direction;
wherein said positioning pin holes and said plurality of optical fibers are arranged in parallel with each other at least in the vicinity of the butt end face of said ferrule so that an arrangement plane of said plurality of optical fibers and said positioning pin holes is inclined at an inclination angle of θ with respect to a plane of the abutting direction, and so that a line where said butt end face and said arrangement plane cross each other is orthogonal to each axis of said plurality of optical fibers; and
wherein said ferrule further comprises a rear end portion arranged so that a pressing force is applied in a substantially vertical direction with respect to said butt end face when said optical connector is abutted against another optical connector and pressed in the abutting direction.

2. The optical connector according to claim 1 wherein said inclination angle θ has a range of $(90-\theta_{c1})/2 < \theta < \theta_{co}$ when a critical angle of light emitted from a core of said optical fibers to air is set to $\theta_{co}$ and a critical angle of light emitted from the core to a clad of said optical fibers is set to $\theta_{c1}$.

3. The optical connector according to claim 2 wherein said inclination angle θ ranges from 6° to 10°.

4. The optical connector according to claim 1, wherein said plurality of optical fibers are mounted on said rear end portion of said ferrule.

* * * * *